United States Patent
Wang et al.

(10) Patent No.: US 11,412,023 B2
(45) Date of Patent: Aug. 9, 2022

(54) VIDEO DESCRIPTION GENERATION METHOD AND APPARATUS, VIDEO PLAYING METHOD AND APPARATUS, AND STORAGE MEDIUM

(71) Applicant: Tencent Technology (Shenzhen) Company Limited, Shenzhen (CN)

(72) Inventors: Jing Wen Wang, Shenzhen (CN); Wen Hao Jiang, Shenzhen (CN); Lin Ma, Shenzhen (CN); Wei Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 152 days.

(21) Appl. No.: 16/885,732

(22) Filed: May 28, 2020

(65) Prior Publication Data
US 2020/0296149 A1 Sep. 17, 2020

Related U.S. Application Data

(63) Continuation of application No. PCT/CN2019/072514, filed on Jan. 21, 2019.

(30) Foreign Application Priority Data

Jan. 24, 2018 (CN) .......................... 201810072504.2

(51) Int. Cl.
*H04L 65/70* (2022.01)
*H04N 19/136* (2014.01)
(Continued)

(52) U.S. Cl.
CPC ............ *H04L 65/70* (2022.05); *G06F 40/169* (2020.01); *G06K 9/629* (2013.01); *G06K 9/6217* (2013.01);
(Continued)

(58) Field of Classification Search
CPC .... H04L 65/607; H04N 19/136; H04N 19/46; H04N 19/85; H04N 21/23418;
(Continued)

(56) References Cited

U.S. PATENT DOCUMENTS 10,027,979 B2 * 7/2018 Eymery ............... H04N 19/126
10,061,986 B2 * 8/2018 Sigal .................. G06K 9/00718
(Continued)

FOREIGN PATENT DOCUMENTS

CN 107391609 A 11/2017
CN 107563498 A 1/2018

OTHER PUBLICATIONS

Chinese Office Action dated Nov. 29, 2019 for Chinese Application No. 2018100725042 including Concise Explanation of Relevance translation (6 pages).
(Continued)

*Primary Examiner* — Jefferey F Harold
*Assistant Examiner* — Franklin S Andramuno
(74) *Attorney, Agent, or Firm* — Crowell & Moring LLP

(57) ABSTRACT

The present disclosure discloses a video description generation method and apparatus, a video playing method and apparatus, and a computer-readable storage medium. The method includes: extracting video features, and obtaining a video feature sequence corresponding to video encoding moments in a video stream; encoding the video feature sequence by using a forward recurrent neural network and a backward recurrent neural network, to obtain a forward hidden state sequence and a backward hidden state sequence corresponding to each video encoding moment; and positioning, according to the forward hidden state sequence and the backward hidden state sequence, an event corresponding to each video encoding moment and an interval corresponding to the event at the video encoding moment, thereby
(Continued)

predicting a video content description of the event. On the basis of distinguishing overlapping events, the interval corresponding to the event is introduced to predict and generate a word corresponding to the event at the video encoding moment, and events that overlap at the video encoding moment correspond to different intervals, so that the video content descriptions of events at this video encoding moment have a high degree of distinction. By analogy, events in the given video stream can be described more distinctively.

17 Claims, 7 Drawing Sheets

(51) Int. Cl.
    *H04N 19/85*     (2014.01)
    *G06K 9/62*     (2022.01)
    *G06V 20/40*     (2022.01)
    *H04N 19/46*     (2014.01)
    *G06F 40/169*     (2020.01)
    *H04N 21/234*     (2011.01)
    *H04N 21/84*     (2011.01)
(52) U.S. Cl.
    CPC .......... *G06V 20/47* (2022.01); *H04N 19/136* (2014.11); *H04N 19/46* (2014.11); *H04N 19/85* (2014.11); *H04N 21/23418* (2013.01); *H04N 21/84* (2013.01); *G06V 20/44* (2022.01)

(58) Field of Classification Search
    CPC .. H04N 21/84; G06F 40/169; G06K 9/00751; G06K 9/6217; G06K 9/629; G06K 2009/00738
    See application file for complete search history.

(56) References Cited

U.S. PATENT DOCUMENTS

| | | | |
|---|---|---|---|
| 11,030,394 B1* | 6/2021 | Kozareva | G06F 40/151 |
| 2009/0252417 A1 | 10/2009 | Perronnin et al. | |
| 2015/0035835 A1* | 2/2015 | Fay | G06T 11/206 |
| | | | 345/440 |
| 2017/0127016 A1 | 5/2017 | Yu et al. | |

OTHER PUBLICATIONS

International Search Report and Written Opinion for PCT/CN2019/072514 dated Apr. 10, 2019 including translation of the International Search Report (11 pages).
Extended European Search Report for European Patent Application No. 19743581.1 dated Jul. 26, 2021 (11 pages).
Álvaro Peris, et al., "Video Description using Bidirectional Recurrent Neural Networks", Aug. 13, 2016 (9 pages).
Ranjay Krishna, et al., "Dense-Captioning Events in Videos", Oct. 22, 2017 (10 pages).
Yi Bin, et al., "Bidirectional Long-Short Term Memory for Video Description", Jun. 15, 2016 (5 pages).

* cited by examiner

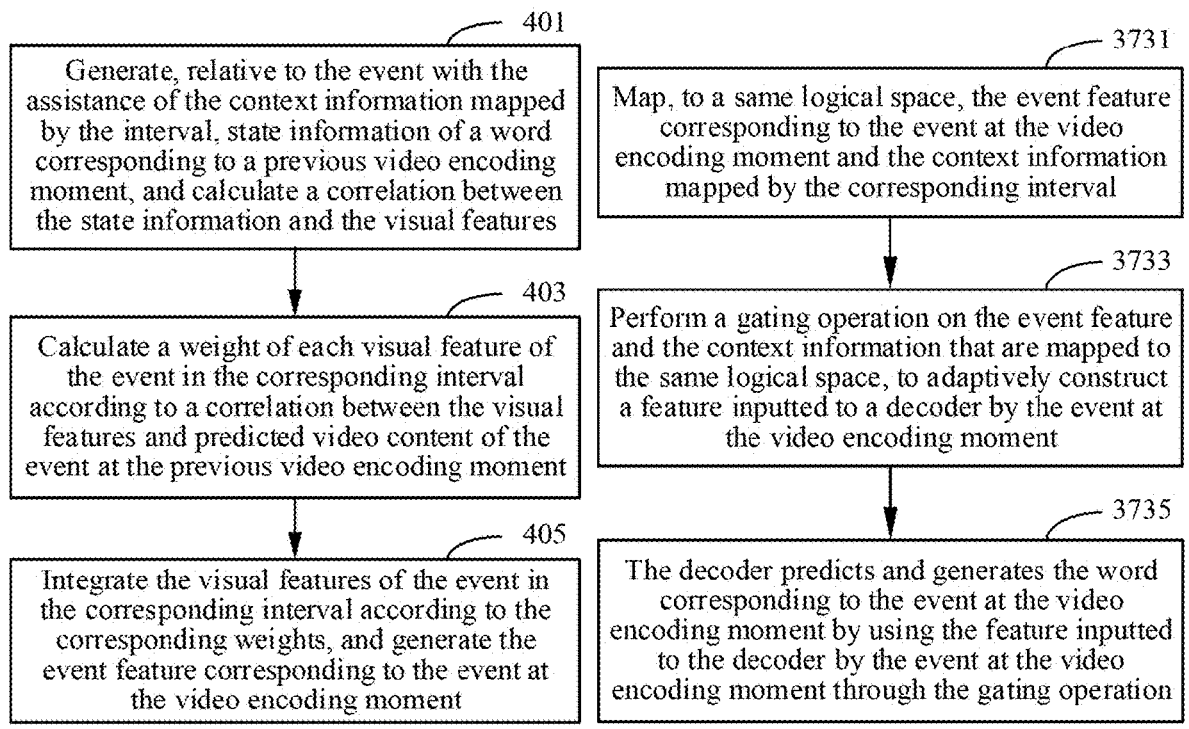
FIG. 7
FIG. 8
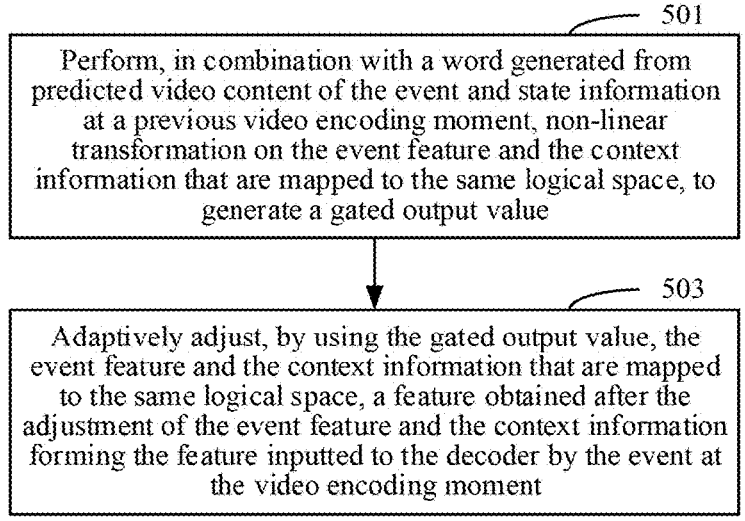
FIG. 9

VIDEO DESCRIPTION GENERATION METHOD AND APPARATUS, VIDEO PLAYING METHOD AND APPARATUS, AND STORAGE MEDIUM

RELATED APPLICATION

This application is a continuation of PCT Application No. PCT/CN2019/072514, filed Jan. 21, 2019, which claims priority to Chinese Patent Application No. 201810072504.2, filed on Jan. 24, 2018 and entitled "VIDEO DESCRIPTION GENERATION METHOD AND APPARATUS, VIDEO PLAYING METHOD AND APPARATUS, AND STORAGE MEDIUM". The contents of each of PCT Application No. PCT/CN2019/072514 and Chinese Patent Application No. 201810072504.2 are incorporated by reference in their entirety.

FIELD OF THE TECHNOLOGY

The present disclosure relates to the field of computer vision technology, and in particular, to a video description generation method and apparatus, a video playing method and apparatus, and a computer-readable storage medium.

BACKGROUND OF THE DISCLOSURE

With the breakthrough application of computer vision technology in artificial intelligence, the quantity of applications of video description generation in the computer vision technology has grown explosively, and the implementation of video description generation is deployed in various applications to complete tasks of video content description for the applications.

In the existing video description generation, an event is detected by using a unidirectional recurrent network to obtain an event characterization vector, and the event characterization vector is inputted to another decoding recurrent network, to generate a corresponding event description.

However, since the unidirectional recurrent network is used and a generated hidden state vector is used as an event characterization vector, events with close end times, that is, events that overlap temporally, cannot be accurately positioned. Consequently, it is impossible to obtain accurate descriptions of video content corresponding to events that overlap temporally.

That is, in the implementation of video description generation, overlapping events cannot be effectively distinguished, and the overlapping events cannot be described more distinctively.

SUMMARY

To resolve the technical problem in the related art that it is difficult to distinguish overlapping events and the overlapping events cannot be described more distinctively in the implementation of video description generation, the present disclosure provides a video description generation method and apparatus, a video playing method and apparatus, and a computer-readable storage medium.

A video description generation method, including:

extracting video features, and obtaining a video feature sequence corresponding to video encoding moments in a video stream;

encoding the video feature sequence by using a forward recurrent neural network and a backward recurrent neural network, to obtain a forward hidden state sequence and a backward hidden state sequence corresponding to each video encoding moment;

positioning, according to the forward hidden state sequence and the backward hidden state sequence, an event corresponding to each video encoding moment and an interval corresponding to the event at the video encoding moment;

predicting a video content description of the event according to the interval corresponding to the event at the video encoding moment, and generating a word corresponding to the event at the video encoding moment; and constructing a natural language description of the event in the video stream by using all words of the event that correspond to the video encoding moments.

A video description generation apparatus, including:

a feature extraction module, configured to extract video features, and obtain a video feature sequence corresponding to video encoding moments in a video stream;

an encoding module, configured to encode the video feature sequence by using a forward recurrent neural network and a backward recurrent neural network, to obtain a forward hidden state sequence and a backward hidden state sequence corresponding to each video encoding moment;

a positioning module, configured to position, according to the forward hidden state sequence and the backward hidden state sequence, an event corresponding to each video encoding moment and an interval corresponding to the event at the video encoding moment;

a description prediction module, configured to predict a video content description of the event according to the interval corresponding to the event at the video encoding moment, and generate a word corresponding to the event at the video encoding moment; and a description construction module, configured to construct a natural language description of the event in the video stream by using all words of the event that correspond to the video encoding moments.

A video description generation apparatus, including:

a processor; and a memory, storing computer-readable instructions, the computer-readable instructions, when executed by the processor, implementing the foregoing method.

A computer-readable storage medium, storing a computer program, the computer program, when executed by a processor, implementing the foregoing method.

A video playing method, applicable to a computer device, including:

obtaining, during playback of a video, a video feature sequence corresponding to video encoding moments in video description generation, and determining a forward hidden state sequence and a backward hidden state sequence corresponding to each video encoding moment;

positioning, according to the forward hidden state sequence and the backward hidden state sequence, an event corresponding to each video encoding moment and an interval corresponding to the event at the video encoding moment;

predicting a video content description of the event according to the interval corresponding to the event at the video encoding moment, and instantly obtaining a natural language description of the event at the video encoding moment in the video stream; and displaying, according to the video encoding moment and a progress of the played video, the corresponding natural language description for the event that occurs in played video content.

A video playing apparatus, including a processor and a memory, the memory storing computer-readable instructions, and the computer-readable instructions, when executed by the processor, implementing the following operations:

obtaining, during playback of a video, a video feature sequence corresponding to video encoding moments in video description generation, and determining a forward hidden state sequence and a backward hidden state sequence corresponding to each video encoding moment;

positioning, according to the forward hidden state sequence and the backward hidden state sequence, an event corresponding to each video encoding moment and an interval corresponding to the event at the video encoding moment;

predicting a video content description of the event according to the interval corresponding to the event at the video encoding moment, and instantly obtaining a natural language description of the event at the video encoding moment in a video stream; and displaying, according to the video encoding moment and a progress of the played video, the corresponding natural language description for the event that occurs in played video content.

The technical solutions provided by the embodiments of the present disclosure may include the following beneficial effects:

For a given video stream, video features are first extracted, and a video feature sequence corresponding to video encoding moments in the video stream is obtained. Then the video feature sequence is encoded by using a forward recurrent neural network and a backward recurrent neural network, to obtain a forward hidden state sequence and a backward hidden state sequence corresponding to each video encoding moment. An event corresponding to each video encoding moment and an interval corresponding to the event at the video encoding moment are positioned according to the forward hidden state sequence and the backward hidden state sequence, to accurately position and effectively distinguish overlapping events at the video encoding moment. Finally a video content description of the event is predicted according to the interval corresponding to the event at the video encoding moment, and a word corresponding to the event at the video encoding moment is generated. So far, a natural language description of the event positioned in the video stream can be constructed by using all words of the event that correspond to the video encoding moments. On the basis of distinguishing overlapping events, the interval corresponding to the event is introduced to predict and generate the word corresponding to the event at the video encoding moment, and events that overlap at the video encoding moment correspond to different intervals, so that the video content descriptions of events at this video encoding moment have a high degree of distinction. By analogy, events in the given video stream can be described more distinctively.

It is to be understood that the above general descriptions and the following detailed descriptions are merely exemplary, and cannot limit the present disclosure.

BRIEF DESCRIPTION OF THE DRAWINGS

The accompanying drawings, which are incorporated herein and constitute a part of this specification, illustrate embodiments consistent with the present disclosure and, together with the description, serve to explain the principles of the present disclosure.

FIG. 7 is a flowchart for describing details of step 3713 according to the embodiment corresponding to FIG. 6.

FIG. 8 is a flowchart for describing details of step 373 according to the embodiment corresponding to FIG. 5.

FIG. 9 is a flowchart for describing details of step 3733 according to the embodiment corresponding to FIG. 8.

DESCRIPTION OF EMBODIMENTS

Exemplary embodiments are described in detail herein, and examples of the exemplary embodiments are shown in the accompanying drawings. When the following descriptions relate to the accompanying drawings, unless otherwise indicated, same numbers in different accompanying drawings represent same or similar elements. Implementations described in the following exemplary embodiments do not represent all implementations consistent with the present disclosure. On the contrary, the implementations described in the following exemplary embodiments are merely examples of apparatuses and methods consistent with some aspects of the present disclosure as described in detail in the appended claims.

Figure 1:
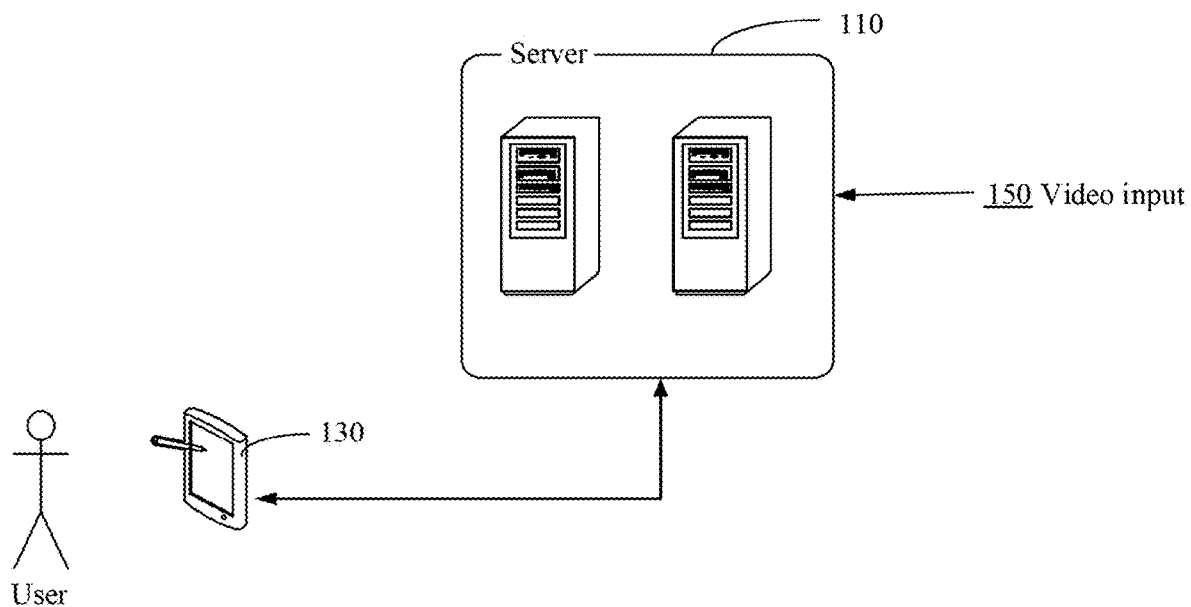
FIG. 1 is a schematic diagram of an implementation environment according to an exemplary embodiment of the present disclosure.

FIG. 1 is a schematic diagram of an implementation environment according to an exemplary embodiment of the present disclosure. In an exemplary embodiment, video description generation implemented by the present disclosure is deployed in a video website, to perform automatic event positioning and voice annotation for a video, thereby completing video segment retrieval, video personalized recommendation and other functions for the video website.

As shown in FIG. 1, a video website that provides videos having functions of video segment retrieval and video personalized recommendation is implemented through a server 110 and a client 130.

The server 110, serving as a video server, performs video processing on an inputted video, that is, a video uploaded by a video provider 150, based on video description generation implemented by the present disclosure, thereby completing corresponding storage.

The client 130 running on various terminal devices obtains a requested video by accessing the server 110. For the video, natural language annotation has been performed on video segments based on the video description generation implemented by the present disclosure, so that the video segments can be quickly extracted during playback of the video.

This is an implementation scene of the video description generation implemented by the present disclosure, but the present disclosure is not limited thereto. The video description generation may also be deployed in various artificial intelligence applications, which are not enumerated here.

Figure 2:
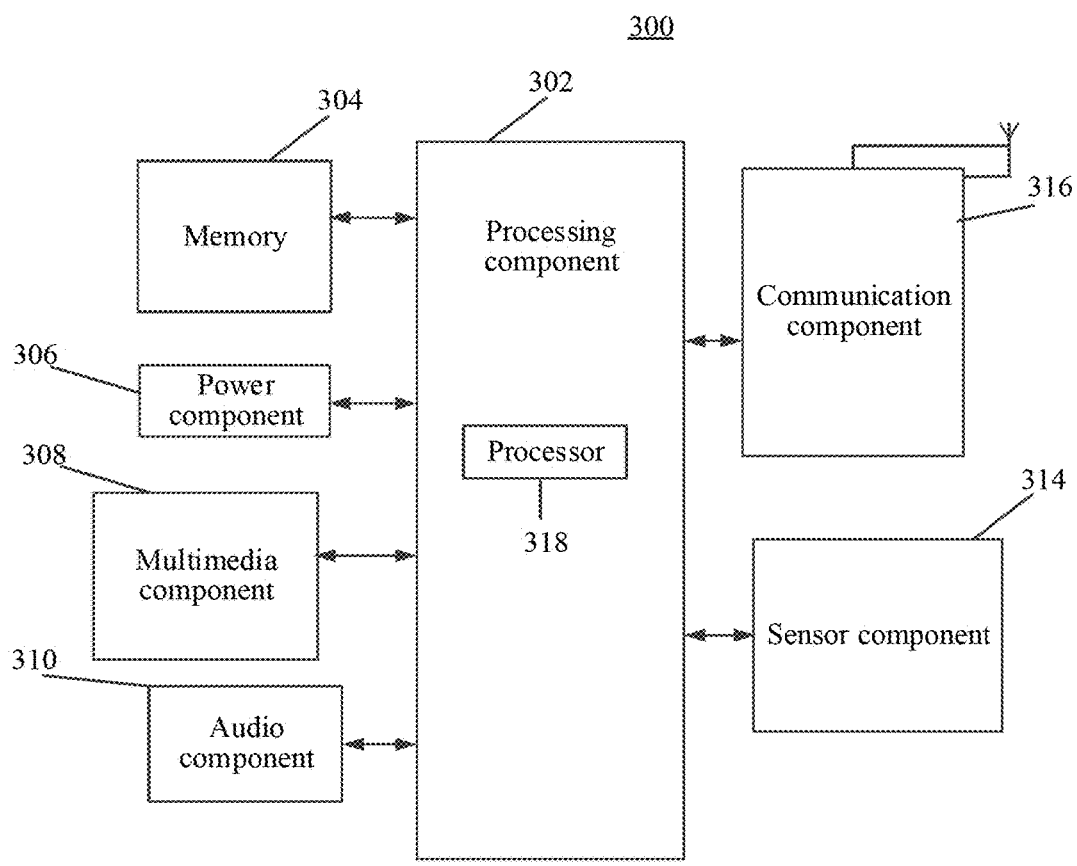
FIG. 2 is a block diagram of an apparatus according to an exemplary embodiment.

FIG. 2 is a block diagram of an apparatus according to an exemplary embodiment. For example, the apparatus 200 may be a recommendation server shown in FIG. 1.

Referring to FIG. 2, the apparatus 200 may vary greatly due to different configurations or performance, and may include one or more central processing units (CPU) 222 (for example, one or more processors) and a memory 232, and one or more storage media 230 (for example, one or more mass storage devices) that store an application program 242 or data 244. The memory 232 and the storage medium 230 may be transient storage or persistent storage. The program stored in the storage media 230 may include one or more modules (not shown in the figure), and each module may include a series of instructions on the server. Further, the CPU 222 may be configured to communicate with the storage medium 230, and perform, on the apparatus 200, a series of instructions and operations in the storage medium 230. The apparatus 200 may further include one or more power supplies 226, one or more wired or wireless network interfaces 250, one or more input/output interfaces 258, and/or one or more operating systems 241, for example, Windows Server™, Mac OS X™, Unix™, Linux™, or FreeBSD™. Steps performed by the server in the embodiments shown in FIG. 4, FIG. 5, FIG. 6, FIG. 7 and FIG. 8 may be based on the apparatus structure shown in FIG. 2.

Figure 3:
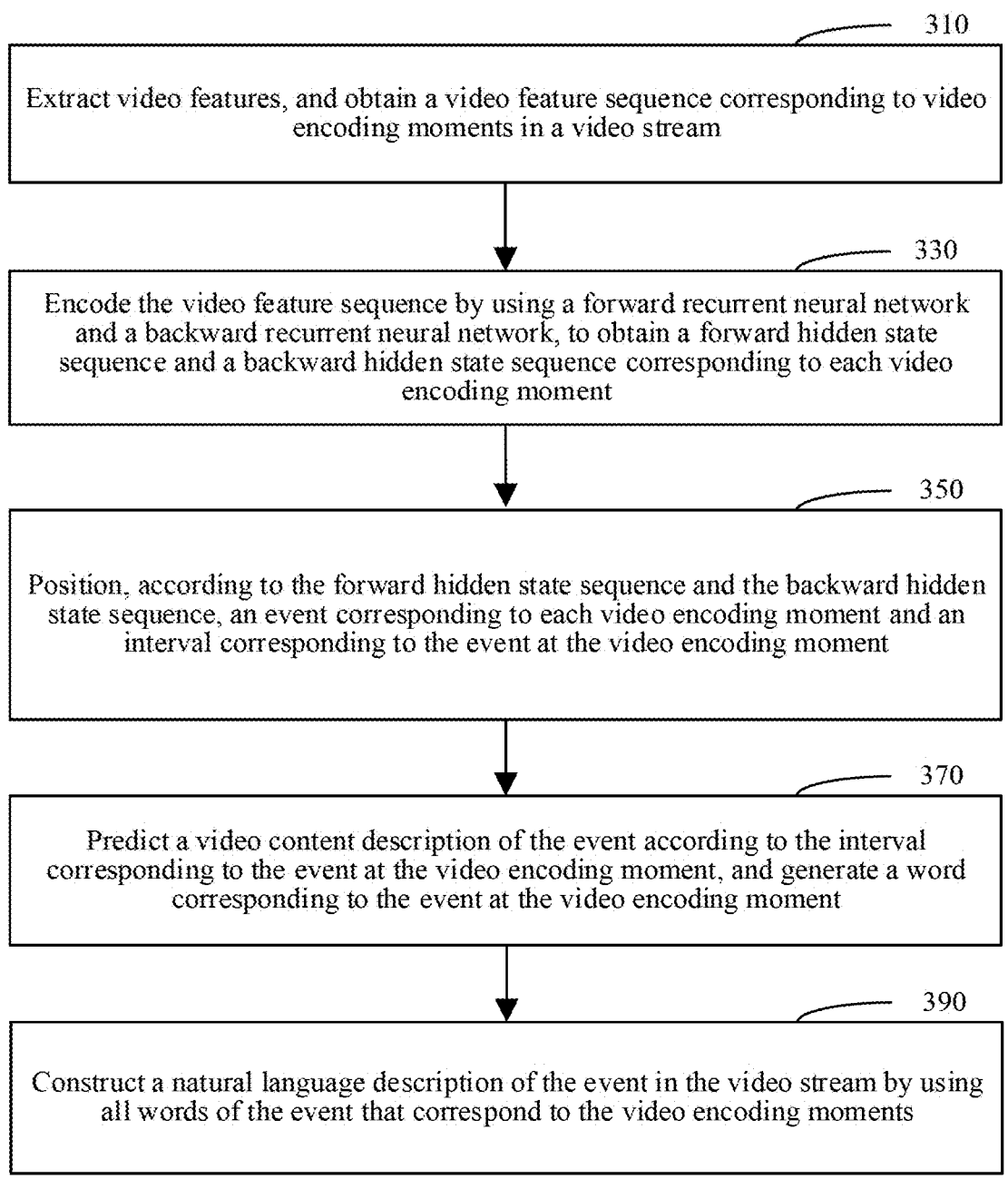
FIG. 3 is a flowchart of a video description generation method according to an exemplary embodiment.

FIG. 3 is a flowchart of a video description generation method according to an exemplary embodiment. The video description generation method, in an exemplary embodiment, as shown in FIG. 3, includes at least the following steps.

In step 310, video features are extracted, and a video feature sequence corresponding to video encoding moments in a video stream is obtained.

A video content description is automatically implemented for the given video stream. The video stream is strongly related to the implementation scene of the video description generation implemented by the present disclosure. Different implementation scenes have video streams carrying different types of video content. For example, if the implementation scene is a security monitoring scenario, the video stream comes from cameras deployed at different locations, and the corresponding video content is content captured by the cameras at respective locations. For another example, if the implementation scene is an implementation scene of a video website, the video stream is stored on a video server and published through the video website, and the corresponding video content is relatively rich.

The video stream has different video images corresponding to a timeline, that is, the display of the video content in the video stream is implemented through the display of each frame of video image and switching between frames of video images. Therefore, the video stream corresponds to a video image sequence, and the video image sequence is formed by frames of video images according to a corresponding chronological order.

Therefore, a video feature at a video encoding moment in the video stream is obtained by performing feature extraction on a video image at the video encoding moment in the video stream according to the video encoding moment. That is, video feature extraction for the given video stream is performed according to certain time interval. The video feature extraction is performed at a specified time interval, so that an object of the video feature extraction is a video image corresponding to a current video encoding moment.

In an exemplary embodiment, step 310 includes: extracting a video feature of the video stream at each video encoding moment according to a specified time interval, the video features corresponding to the video encoding moments sequentially forming the video feature sequence.

The specified time interval here refers to a frequency of video feature extraction configured for video description generation. For example, the specified time interval may be 2 seconds, and thus the video feature extraction is performed on the video stream at intervals of 2 seconds on a timeline of the video stream.

The video feature extraction is performed sequentially on the video stream along the timeline. An extracted video feature definitely corresponds to a video encoding moment, that is, a video encoding moment when the video feature is extracted, so that the extracted video features can form a video feature sequence according to a chronological order corresponding to the video encoding moments.

The video feature sequence includes all video features obtained by performing the video feature extraction on the video stream. It is to be understood that, the video feature is used to describe a visual feature of the video image at the corresponding video encoding moment, and by analogy, visual features of the video stream can be obtained by using the video feature sequence.

Video features correspond to different forms depending on the implementation of an extraction process. In an exemplary embodiment, the video feature extraction is performed by using a deep neural network technology, and extracted video features are consistent with the deep neural network technology. For example, if a convolutional neural network (CNN) is used, a video feature is a 3D convolutional feature. Since the convolutional neural network performs feature extraction through local perception and parameter sharing, the convolutional neural network is applicable to the video feature extraction, thereby ensuring the accuracy of extracted features.

Further, the video feature extraction performed according to a specified time interval is implemented by performing video feature extraction on the video stream by using a sliding window, to improve the smoothness and efficiency of the video feature extraction.

In step 330, the video feature sequence is encoded by using a forward recurrent neural network and a backward recurrent neural network, to obtain a forward hidden state sequence and a backward hidden state sequence corresponding to each video encoding moment.

After the video feature sequence is obtained by performing extraction on the video stream, the video feature sequence is encoded by using the forward recurrent neural network and the backward recurrent neural network respectively. The encoding process is performed for each video feature in the video feature sequence, and each video feature corresponds to a video encoding moment on the timeline of the video stream. Therefore, the forward hidden state sequence and the backward hidden state sequence corresponding to the video encoding moment are obtained by encoding the video features.

Specifically, the encoding the video feature sequence includes: on one hand, encoding the video feature sequence from the front to the back by using the forward recurrent neural network according to the corresponding video encoding moments to obtain the forward hidden state sequence; and on the other hand, encoding the video feature sequence from the back to the front by using the backward recurrent neural network according to the corresponding video encoding moments to obtain the backward hidden state sequence.

Since the encoding is performed for the video features corresponding to the video encoding moments, the obtained hidden state sequences correspond to the video encoding moments. That is, hidden states included in the forward hidden state sequence and the backward hidden state sequence correspond to the video encoding moments.

Both the hidden forward sequence and the hidden backward sequence include hidden states. It is to be understood that, the hidden state is a vector description of a video feature corresponding to a video encoding moment, and the hidden state carries video information at the corresponding video encoding moment.

Further, for the forward hidden state sequence obtained by encoding from the front to the back along the timeline corresponding to the video stream, a forward hidden state in the forward hidden state sequence carries historical information at a corresponding video encoding moment; and for the backward hidden state sequence obtained by encoding from the back to the front along the timeline corresponding to the video stream, a backward hidden state in the backward hidden state sequence carries future information at a corresponding video encoding moment.

Therefore, for a video encoding moment, the performed video content description is no longer limited to the extracted video features, and a context correlation at the video encoding moment is also considered under the action of the forward hidden state and the backward hidden state, thereby ensuring the accuracy and comprehensiveness of the video content description at the video encoding moment.

In other words, under the action of the forward recurrent neural network and the backward recurrent neural network, descriptions are made at each video encoding moment based on a video feature, historical information, and future information respectively, as the obtained forward hidden state sequence and backward hidden state sequence.

In step 350, an event corresponding to each video encoding moment and an interval corresponding to the event at the video encoding moment are positioned according to the forward hidden state sequence and the backward hidden state sequence.

It is to be understood that, a video feature description and a context correlation corresponding to each video encoding moment can be obtained by using the forward hidden state sequence and the backward hidden state sequence, so that an event at the video encoding moment can be accurately predicted.

As video content in the video stream develops, one video encoding moment usually corresponds to one or more events. In other words, these events overlap temporally at this video encoding moment, and it is necessary to identify the temporally overlapping events by using the forward hidden state sequence and the backward hidden state sequence, that is, to position an event corresponding to each video encoding moment.

The event is related to video content description to be performed. As video content in the video stream develops, an event that occurs in each time period constitute the video content of the video stream. Therefore, an event that needs to be identified and positioned corresponds to a time period on the timeline and is in a video segment in the video stream. For an event positioned at a video encoding moment, an interval corresponding to the event at the video encoding moment is included in the time period corresponding to the event on the timeline.

Therefore, under the action of the forward hidden state sequence and the backward hidden state sequence, for each video encoding moment, one or more events corresponding to the video encoding moment and an interval corresponding to each event are obtained.

So far, temporally overlapping events are positioned for the video stream. The accurate positioning of events in the video stream can ensure that a natural language description for each event is accurately generated subsequently, thereby greatly improving the quality of positioning and description.

In step 370, a video content description of the event is predicted according to the interval corresponding to the event at the video encoding moment, and a word corresponding to the event at the video encoding moment is generated.

After the event that occurs at the video encoding moment is obtained through positioning, a video content description corresponding to the event at the video encoding moment can be implemented according to the interval corresponding to the event. Further, although events overlapping at the video encoding moment overlap temporally, each event corresponds to a different interval. To be specific, each event has different context correlations at the same video encoding moment. Therefore, a video content description of the event is predicted at the video encoding moment according to the corresponding interval.

So far, the generated word corresponding to the event at the video encoding moment is a video content description predicted for the event at the video encoding moment.

In step 390, a natural language description of the event in the video stream is constructed by using all words of the event that correspond to the video encoding moments.

By performing step 370, and by analogy, for an event occupying a time period, all words of the event that correspond to all video encoding moments in the time period are obtained, and these words form a natural language description of the event.

So far, an automatic description of video content corresponding to each event in the video stream can be implemented without manual annotation. Even events that highly overlap temporally can be effectively distinguished, so that the events can be described more distinctively, thereby implementing intensive descriptions of the video.

Figures 4, 5:
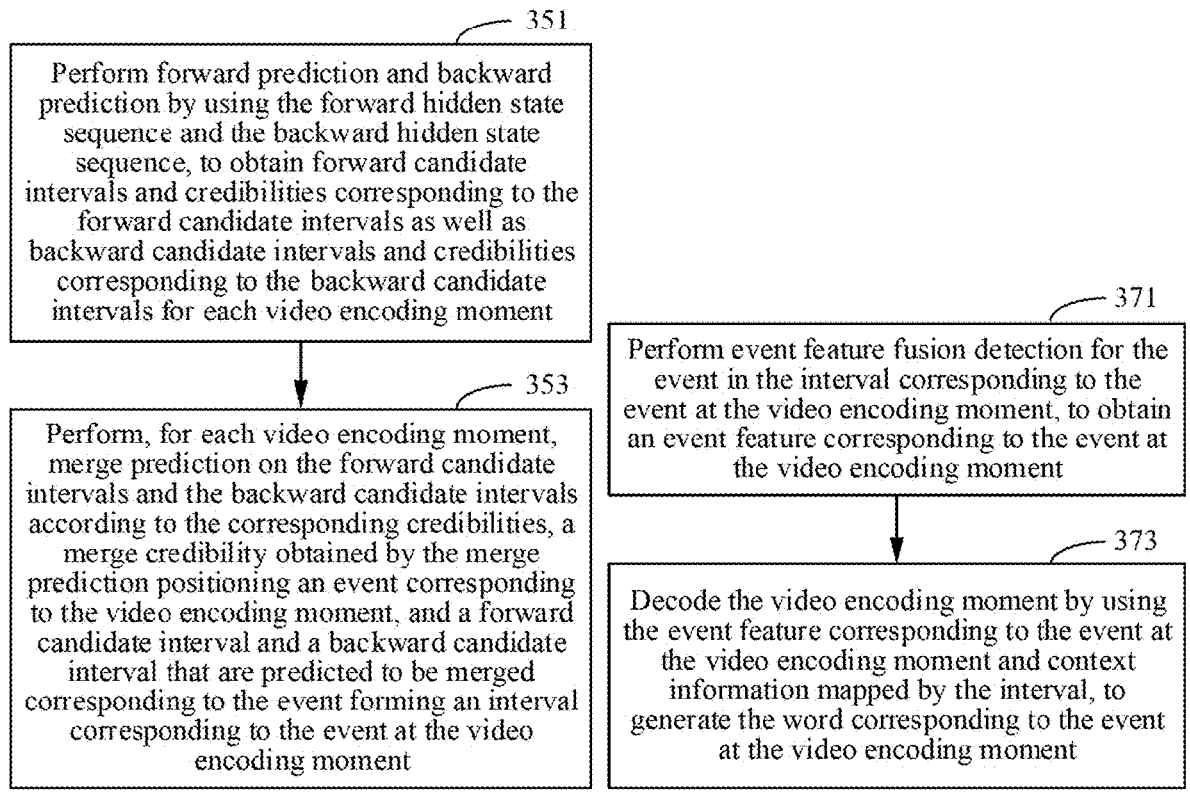
FIG. 4 is a flowchart for describing details of step 350 according to the embodiment corresponding to FIG. 3.
FIG. 5 is a flowchart for describing details of step 370 according to the embodiment corresponding to FIG. 3.

FIG. 4 is a flowchart for describing details of step 350 according to the embodiment corresponding to FIG. 3. Step 350, as shown in FIG. 4, includes at least the following steps.

In step 351, forward prediction and backward prediction are performed by using the forward hidden state sequence and the backward hidden state sequence, to obtain forward candidate intervals and credibilities corresponding to the forward candidate intervals as well as backward candidate intervals and credibilities corresponding to the backward candidate intervals for each video encoding moment.

After video feature extraction and video feature encoding are performed for a given video stream, a forward hidden state sequence and a backward hidden state sequence of the given video stream can be obtained. In this case, forward prediction and backward prediction are performed for each video encoding moment based on the forward hidden state sequence and the backward hidden state sequence respectively, so that a forward candidate interval obtained through forward prediction by using the forward hidden state sequence and a credibility corresponding to the forward candidate interval are obtained, as well as a backward candidate interval obtained through backward prediction by using the backward hidden state sequence and a credibility corresponding to the backward candidate interval are obtained.

Therefore, several forward candidate intervals and several backward candidate intervals are obtained by performing forward prediction and backward prediction at each video encoding moment.

Both the forward candidate interval and the backward candidate interval are candidate intervals corresponding to the same category as hidden states at the video encoding moment, to be specific, the forward hidden state and the backward hidden state. That is, the predicting candidate intervals is obtaining, based on hidden states, candidate intervals corresponding to the same category for the video encoding moment. The corresponding credibility represents a possibility that the event candidate interval obtained through prediction at the video encoding moment includes the event, and finally an interval corresponding to the event is obtained.

In a specific implementation of an exemplary embodiment, as described above, both the forward hidden state sequence and the backward hidden state sequence are obtained through coding by the recurrent neural network. Correspondingly, the subsequent forward prediction and backward prediction are implemented by using a layer of fully connected network.

Specifically, the performing forward prediction is predicting, in the forward hidden state sequence by using a layer of fully connected network, several intervals forward for each forward hidden state at a corresponding video encoding moment. The intervals obtained through prediction are forward candidate intervals.

For each forward candidate interval, a corresponding credibility is obtained through a non-linear transformation operation, such as a Sigmoid operation. A forward hidden state sequence is $\{\vec{h}_t\}$, t is a video encoding moment, t=1, 2, ..., and $\vec{h}_t$ is a forward hidden state corresponding to the video encoding moment t. By performing the Sigmoid operation, the forward hidden state is mapped to a new space after passing through a neuron, and the forward hidden state is activated after weighting and offset processing in the space, to obtain a credibility, as shown in the following formula:

$$\vec{C}^t_p = \delta(\vec{W}_c \vec{h}_t + \vec{b}_c)$$

$\vec{C}^t_p$ is a credibility corresponding to the forward candidate interval, $\delta(\ )$ is a Sigmoid classification function, $\vec{W}_c$ is a weight coefficient, and $\vec{b}_c$ is an offset.

Similarly, for each backward candidate interval, a corresponding credibility can be obtained by using the following formula:

$$\overleftarrow{C}^t_p = \delta(\overleftarrow{W}_c \overleftarrow{h}_t + \overleftarrow{b}_c)$$

$\overleftarrow{C}^t_p$ is a credibility corresponding to the backward candidate interval, $\overleftarrow{W}_c$ is a weight coefficient, and $\overleftarrow{h}_t$ is a backward hidden state.

So far, for each video encoding moment, forward and backward intervals have been predicted according to the forward hidden state and the backward hidden state, and the credibilities of the predicted intervals have been obtained.

In step 353, merge prediction is performed on the forward candidate intervals and the backward candidate intervals for each video encoding moment according to the corresponding credibilities, a merge credibility obtained by the merge prediction positioning an event corresponding to the video encoding moment, and a forward candidate interval and a backward candidate interval that are predicted to be merged corresponding to the event forming an interval corresponding to the event at the video encoding moment.

After several forward candidate intervals and several backward candidate intervals are obtained for each video encoding moment by performing the foregoing step, merge prediction is still performed on the forward candidate intervals and the backward candidate intervals for each video encoding moment, to obtain an interval corresponding to the event at the video encoding moment.

It is to be understood that, for a video encoding moment, the several forward candidate intervals and the several backward candidate intervals obtained through prediction are combined to form candidate intervals that may include the event. Because there are a plurality of forward candidate intervals and backward candidate intervals obtained through prediction, a plurality of candidate intervals that may include the event can be obtained. Therefore, it is necessary to determine, by using a merge credibility obtained by the merge prediction, which candidate interval includes the event, so that the event can be positioned.

The merge prediction is performed according to the credibility corresponding to the forward candidate interval and the credibility corresponding to the backward candidate interval. That is, a probability that an interval formed by combining a forward candidate interval and a backward candidate interval includes an event is calculated according to the corresponding credibilities. A greater merge credibility obtained through calculation indicates a higher probability.

For a video encoding moment, merge prediction is performed on each pair of the forward candidate interval and the backward candidate interval obtained through prediction, to obtain a merge credibility, and the obtained merge credibility is used to select an interval including an event. For example, an interval corresponding to a merge credibility above a certain limit value can be regarded as an interval including an event.

In a specific implementation of an exemplary embodiment, after the forward prediction and the backward prediction are completed by performing a forward operation and a backward operation, N events are positioned, and corresponding forward and backward scores, that is, the credibilities mentioned above, are obtained, where the credibilities are assumed to be $\{\vec{C}_i^t\}_{i=1,\ldots,N}$ and $\{\overleftarrow{C}_i^t\}_{i=1,\ldots,N}$. In this case, a credibility score indicating a possibility that an event exists in a merged interval, that is, a merge credibility, is obtained by performing a merge operation.

For example, the merge operation may be a multiplication operation, and the merge credibility is obtained by using the following formula:

$$C_p = \{\overrightarrow{C_i} \times \overleftarrow{C_i}\}_{i=1}^{N}$$

In this case, when the merge credibility is greater than the set limit value, it is considered that an event that occurs at the current corresponding video encoding moment exists in the interval formed by the corresponding forward candidate interval and backward candidate interval, so that the event at the video encoding moment can be obtained through positioning. By analogy, all events at the video encoding moment and an interval corresponding to each event can be obtained through positioning.

According to the exemplary embodiment, overlapping events at a previous video encoding moment can be identified, that is, the overlapping events can be obtained through identification and positioning based on a different interval corresponding to each event, and a plurality of events can be identified at each video encoding moment in the video stream. Therefore, it is no longer limited to the identification of a single event, and a plurality of events at a video encoding moment is no longer identified as one event, thereby enhancing the pertinence and distinctiveness, improving the accuracy of event identification in the video stream, and avoiding the omission of events in the event identification of the video stream.

In an exemplary embodiment, for a plurality of natural language descriptions predicted for one event, joint ranking is performed to obtain a result output with a high credibility.

Specifically, the natural language description of the event exists, for example, in the form of sentence, and a credibility of a description sentence, that is, a sentence credibility, is calculated for the natural language description, so that a description credibility is obtained through calculation in combination with the merge credibility, and a sentence with a high description credibility is screened out from the outputted natural language description.

In a specific implementation of an exemplary embodiment, the sentence credibility is obtained through calculation by using the following formula:

$$C_c = \sum_{i=1}^{M} \log(p(w_i))$$

$w_i$ is an $i^{th}$ word in a sentence including M words.

So far, the description credibility is obtained through calculation by using the formula $C = 10 \times C_p + C_c$.

FIG. 5 is a flowchart for describing details of step 370 according to the embodiment corresponding to FIG. 3. Step 370, as shown in FIG. 5, includes at least the following steps.

In step 371, event feature fusion detection is performed for the event in the interval corresponding to the event at the video encoding moment, to obtain an event feature corresponding to the event at the video encoding moment.

As described above, different events correspond to different intervals, that is, have different video segments. Therefore, different events have different event features, and the event features can be obtained through fusion detection on the video segments corresponding to the events by using existing context-related information.

The event feature is used to characterize main content of an event, and is obtained by detecting and processing the video segment corresponding to the event, that is, by performing fusion detection. On one hand, the event feature fusion detection is implemented in the interval corresponding to the event at the video encoding moment. It is to be understood that, the performing fusion detection in the interval corresponding to the event is performing fusion detection on the video segment corresponding to the event, to ensure the accuracy and comprehensiveness of collection of information related to the event.

On the other hand, the performing fusion detection is used to implement accurate and reliable obtaining of event features. Specifically, visual feature detection is performed on the video segment corresponding to the event, and a feature such as a context correlation is obtained; fusion is performed on the visual feature and the context correlation, to complete the foregoing fusion detection.

Correspondingly, the obtained event feature is closely related to the visual feature and the context correlation. Therefore, the event feature obtained by fusion detection reflects visual content presented by the video segment. In addition, connection with the previous and subsequent video content descriptions is also established, thereby enhancing the smoothness and semantic performance of generated video descriptions of the video stream.

At one video encoding moment, different events correspond to different intervals, so that different event features are obtained accordingly, to complete clear descriptions of a plurality of events at the same video encoding moment respectively.

Further, the event in the video stream is positioned in the foregoing step, that is, a plurality of events at each video encoding moment is obtained through positioning, so that in this exemplary embodiment, event feature fusion detection is performed for each event at each video encoding moment, so as to facilitate a video content description for each event at each video encoding moment.

In step 373, the video encoding moment is decoded by using the event feature corresponding to the event at the video encoding moment and context information mapped by the interval, and the word corresponding to the event at the video encoding moment is generated.

The extracted video feature is encoded by using a forward recurrent network and a backward recurrent network, and each video feature corresponds to a video encoding moment. Therefore, the video encoding moment is encoded.

A forward hidden sequence and a backward hidden state sequence are obtained through encoding. Both the forward hidden state sequence and the backward hidden state sequence are encoding vectors obtained by encoding the video encoding moment. Correspondingly, the video encoding moment will also be decoded, so that a video content description of the event at the video encoding moment is generated.

The event feature describes the event itself. The context information mapped by the interval is the video content description of the event that fully considers the previous and subsequent video contents, which is implemented by the forward hidden state carrying historical information and the backward hidden state carrying future information.

The context information mapped by the interval is used to indicate a video segment corresponding to the interval, that is, a context correlation of the event. An interval corresponding to an event at a video encoding moment includes two interval endpoints. The two interval endpoints are two video encoding moments in chronological order, that is, a front video encoding moment and a rear video encoding moment. A forward hidden state corresponding to the front video encoding moment and a backward hidden state corresponding to the rear video encoding moment form context information corresponding to the interval.

The event at the video encoding moment is interpreted according to the event feature and the context information, and the word corresponding to the event at the video encoding moment is generated. In other words, the word generated for the event by decoding the video encoding moment describes the event at the video encoding moment and describes video content corresponding to the event at the video encoding moment. The accurate description of the video stream and the event in the video stream is guaranteed by using the video encoding moment as a unit.

Figure 6:
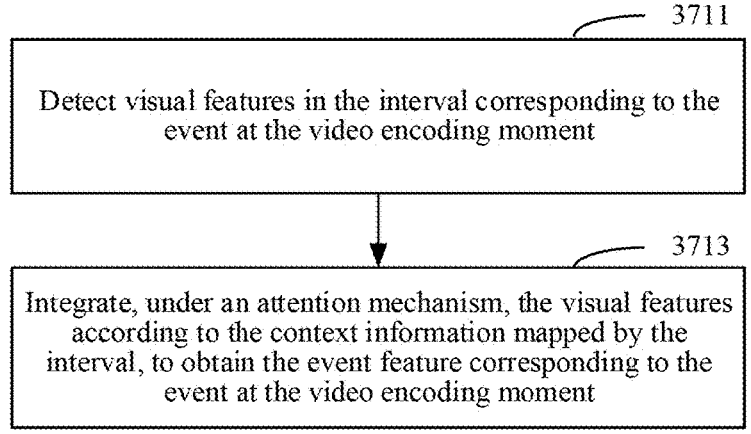
FIG. 6 is a flowchart for describing details of step 371 according to the embodiment corresponding to FIG. 5.

FIG. 6 is a flowchart for describing details of step 371 according to the embodiment corresponding to FIG. 5. In an exemplary embodiment, as shown in FIG. 6, step 371 includes at least the following steps.

In step 3711, visual features in the interval corresponding to the event at the video encoding moment are detected.

The visual feature is a feature, existing visually, of the video segment in the interval corresponding to the event. For example, various marks in a displayed video image are visual features.

In step 3713, the visual features are integrated under an attention mechanism according to the context information mapped by the interval, to obtain the event feature corresponding to the event at the video encoding moment.

The attention mechanism is used to pay attention to the interval corresponding to the event, that is, a local image related to a final output word in the video segment where the event is located. Through the introduction of the attention mechanism, key frame information in the video can be better positioned, so that words of the corresponding natural language description can be accurately obtained.

In the exemplary embodiment described above, the video description generation in the present disclosure is implemented based on the encoding-decoding architecture. The so-called encoding is to convert an inputted video feature sequence into a vector having a certain length; and the decoding is to convert the previously generated vector into an output sequence, that is, a word sequence. Between the encoding and the decoding, due to the need to adapt to video processing, a length of a vector outputted after the encoding is often different from a length of a vector that needs to be inputted to the decoding. Therefore, the processing needs to be performed under the action of the attention mechanism, to ensure that the vector inputted to the decoding fully carries key frame information, thereby adaptively adapting to the implementation of the decoding process while ensuring the accuracy of information.

Specifically, under the attention mechanism, the video feature is processed in combination with the context information mapped by the interval, that is, the fusion between the video feature and the context information is implemented. Generating of a corresponding word in the decoding process is based on the process of generating a previous word by the decoder, that is, participates in the fusion of visual features according to the correlation with the previous word.

The previous word referred to is a previous word generated by the decoder through decoding a previous video encoding moment. In a specific implementation of an exemplary embodiment, a word embedding vector corresponding to the previous word and state information corresponding to the decoder generating the previous word are used to characterize the generation of the previous word in the decoder, so that the corresponding word embedding vector and state information are applied to the next word, that is, event feature fusion currently inputted to the decoder.

Further, the state information corresponding to the decoder generating the previous word indicates a probability that the video content is described as the generated previous word. A correlation between the detected visual feature and a current state of the decoder is first obtained with the assistance of the generated previous word and the state information, so that existing key frame information is better positioned, and then attention fusion is implemented according to a weight of the positioned key frame information, to obtain the event feature.

FIG. 7 is a flowchart for describing details of step 3713 according to the embodiment corresponding to FIG. 6. In an exemplary embodiment, as shown in FIG. 7, step 3713 includes at least the following steps.

In step 401, state information of a word corresponding to a previous video encoding moment is generated relative to the event with the assistance of the context information mapped by the interval, and a correlation between the state information and the visual features is calculated.

As described above, the context information mapped by the interval includes the forward hidden state corresponding to the front video encoding moment and the backward hidden state corresponding to the rear video encoding moment on the endpoints.

The context information mapped by the interval is introduced to calculate the correlation between the state information of the word corresponding to the previous video encoding moment and the video feature at the current video encoding moment for the event. Further, the context information is simultaneously fused to calculate the correlation, as shown in the following formula:

$$z_i^t = W_a^T \cdot \tanh(W_v \cdot v_i + W_h \cdot [\vec{h}_n, \overleftarrow{h}_m] + W_H \cdot H_{t-1} + b)$$

$z_i^t$ is a correlation between the visual feature $v_i \in V = \{v_k\}_{k=1, \ldots, p}$ of the detected event and current state information $H_{t-1}$, of the decoder, $z_i^t = W_a^T \cdot \tanh(W_v \cdot v_i + W_h \cdot [\vec{h}_n, \overleftarrow{h}_m] + W_H \cdot H_{t-1} + b)$, $z_i^t = W_a^T \cdot \tanh(W_v \cdot v_i + W_h \cdot [\vec{h}_n, \overleftarrow{h}_m] + W_H \cdot H_{t-1} + b)$, $z_i^t = W_a^T \cdot \tanh(W_v \cdot v_i + W_h \cdot [\vec{h}_n, \overleftarrow{h}_m] + W_H \cdot H_{t-1} + b)$, and $z_i^t = W_a^T \cdot \tanh(W_v \cdot v_i + W_h \cdot [\vec{h}_n, \overleftarrow{h}_m] + W_H \cdot H_{t-1} + b)$, correspond to weight coefficients, tanh is used to indicate a tanh activation function used by non-linear transformation, $z_i^t = W_a^T \cdot \tanh(W_v \cdot v_i + W_h \cdot [\vec{h}_n, \overleftarrow{h}_m] + W_H \cdot H_{t-1} + b)$ is context information, $[\cdot, \cdot]$ represents vector splicing, $z_i^t = W_a^T \cdot \tanh(W_v \cdot v_i + W_h \cdot [\vec{h}_n, \overleftarrow{h}_m] + W_H \cdot H_{t-1} + b)$ is current state information of the decoder, and b is an offset term.

In step 403, a weight of each visual feature of the event in the corresponding interval is calculated according to a correlation between the visual features and predicted video content of the event at the previous video encoding moment.

Through the foregoing step 401, after obtaining a correlation of each visual feature relative to a current state of the decoder through calculation, a weight of each video feature can be calculated by using the correlations corresponding to all video features.

The weight of each visual feature of the event in the corresponding interval is used to indicate the importance of the corresponding visual feature to the video content description, so that the corresponding visual feature can be integrated under the attention mechanism according to the indicated importance.

In a specific implementation of an exemplary embodiment, the weight calculation is implemented by using the following formula:

$$\alpha_i^t = \exp(z_i^t) \Big/ \sum_{k=1}^{p} \exp(z_k^t)$$

$\alpha_i^t = \exp(z_i^t)/\Sigma_{k=1}^{p} \exp(z_k^t)$ is a weight of a visual feature $z_i^t = W_a^T \cdot \tanh(W_v \cdot v_i + W_h \cdot [\vec{h}_n, \tilde{h}_m] + W_H \cdot H_{t-1} + b)$, and p is a quantity of visual features.

In step 405, the visual features of the event in the corresponding interval are integrated according to the corresponding weights, to generate the event feature corresponding to the event at the video encoding moment.

The weight corresponding to each visual feature is used to integrate all visual features in the interval where the event is located, to obtain the event feature of the event at the video encoding moment.

It is to be understood that the weight corresponding to each visual feature is obtained through calculation with reference to the context information and the current state of the decoder that performs decoding to generate the previous word. The weight is not limited to a single visual feature, but is obtained through calculation over the entire event, that is, the video segment corresponding to the event, so that the obtained weight accurately measures the importance of the corresponding visual feature for the event.

So far, the visual features can be integrated by using the weight corresponding to each visual feature, to generate the event feature corresponding to the event at the video encoding moment.

The integration of the visual features is integration of attention through a weighted sum, completed by weighting and offset processing. The event feature $\tilde{v}^t = \Sigma_{i=1}^{p} \alpha_i^t \cdot v_i$ can be obtained through integration by using the following formula:

$$\tilde{v}^t = \sum_{i=1}^{p} \alpha_i^t \cdot v_i$$

Through the exemplary embodiment described above, the decodable event feature is obtained under the action of the attention mechanism. So far, as the decoding in the decoder proceeds, the video description corresponding to the event at the current video encoding moment is obtained, that is, the corresponding word is generated.

FIG. 8 is a flowchart for describing details of step 373 according to the embodiment corresponding to FIG. 5. In an exemplary embodiment, as shown in FIG. 8, step 373 includes at least the following steps.

In step 3731, the event feature corresponding to the event at the video encoding moment and the context information mapped by the corresponding interval are mapped to a same logical space.

Through the foregoing exemplary embodiment, the event feature corresponding to the event at the video encoding moment is obtained through calculation, so that the feature inputted to the decoder is calculated by using the obtained event feature and context information.

Before the feature calculation, the event feature and the context information need to be mapped to the same logical space, to obtain the event feature and the context information with the same scale.

In a specific implementation of an exemplary embodiment, the event feature and the context information are mapped to the same logical space through non-linear transformation using a tanh activation function.

Details are shown in the following formula:

$$\dot{v}^t = \tanh(\tilde{W} \cdot \tilde{v}^t)$$

$$h = \tanh(W_{ctx} \cdot [\vec{h}_n, \tilde{h}_m])$$

$\dot{v}^t = \tanh(\tilde{W} \cdot \tilde{v}^t)$ is the event feature mapped to the logical space, $\dot{v}^t = \tanh(\tilde{W} \cdot \tilde{v}^t)$ is a weight coefficient, h is the context information mapped to the logical space, and $h = \tanh(W_{ctx} \cdot [\vec{h}_n, \tilde{h}_m])$ is a weight coefficient.

In step 3733, a gating operation is performed on the event feature and the context information that are mapped to the same logical space, to adaptively construct a feature input to a decoder by the event at the video encoding moment.

The gating operation is used to adaptively adjust, based on the context, relative contributions of the current event feature and the context information to the prediction of the next word. According to the previous word predicted by the decoder and the corresponding state information of the decoder, a non-linear operation is performed to complete the gating operation, and a value outputted by the gating operation is used to balance the event feature and the context information.

FIG. 9 is a flowchart for describing details of step 3733 according to the embodiment corresponding to FIG. 8. In an exemplary embodiment, as shown in FIG. 9, step 3733 includes at least the following steps.

In step 501, in combination with a word generated from predicted video content of the event and state information at a previous video encoding moment, non-linear transformation is performed on the event feature and the context information that are mapped to the same logical space, to generate a gated output value.

In step 503, the event feature and the context information that are mapped to the same logical space are adaptively adjusted by using the gated output value, a feature that is obtained after the adjustment of the event feature and the context information forming a feature inputted to a decoder by the event at the video encoding moment.

In a specific implementation of an exemplary embodiment, the execution of the gating operation is implemented by using the following formula:

$$g_{ctx} = \sigma(W_g \cdot [\dot{v}^t, h, E_t, H_{t-1}])$$

$g_{ctx} = \sigma(W_g \cdot [\dot{v}^t, h, E_t, H_{t-1}])$ is a contribution proportion of context information in predicting the next word in the decoding, and $g_{ctx} = \sigma(W_g \cdot [\dot{v}^t, h, E_t, H_{t-1}])$ is a word embedding vector.

The event feature and the context information that are mapped to the same logical space are adjusted by using a value outputted by the gating operation, to obtain a feature inputted to the decoder.

In a specific implementation of an exemplary embodiment, the input received by the decoder at a video encoding moment t is:

$$F = [(1 - g_{ctx}) \times \dot{v}^t, g_{ctx} \times h]$$

F is a feature input to the decoder at the video encoding moment t, and x represents element-wise multiplication.

In step 3735, the word corresponding to the event at the video encoding moment is predicted and generated by the decoder by using the feature inputted to the decoder by the event at the video encoding moment through the gating operation.

After the feature of the event at the video encoding moment t is inputted to the decoder, a word corresponding to the event at the video encoding moment t is outputted by the decoder after calculation.

In a specific implementation of an exemplary embodiment, the decoder used is a long short-term memory (LSTM) decoder, that is, a recurrent unit of long short-term memory.

By analogy, words corresponding to a plurality of events at each video encoding moment can be obtained, so that a natural language description of events in the video stream is formed.

Through the exemplary embodiments described above, the video content description service is implemented. Under the operation of the video content description service, video feature extraction and event positioning and description can be performed on the video stream in a background server, and event positioning quality and description quality of video intensive description can be improved.

For example, the video content description service is deployed on a video website, and automatic positioning and language annotation are performed on video segments of interest, thereby implementing fast video segment extraction, video segment retrieval, and video personalized recommendation.

The foregoing video description generation method is described by using a video stream as an example. The video stream is a video to be released by a video website. After the release, event positioning and language annotation are implemented by using the video description generation method shown in the present disclosure.

Figure 10:
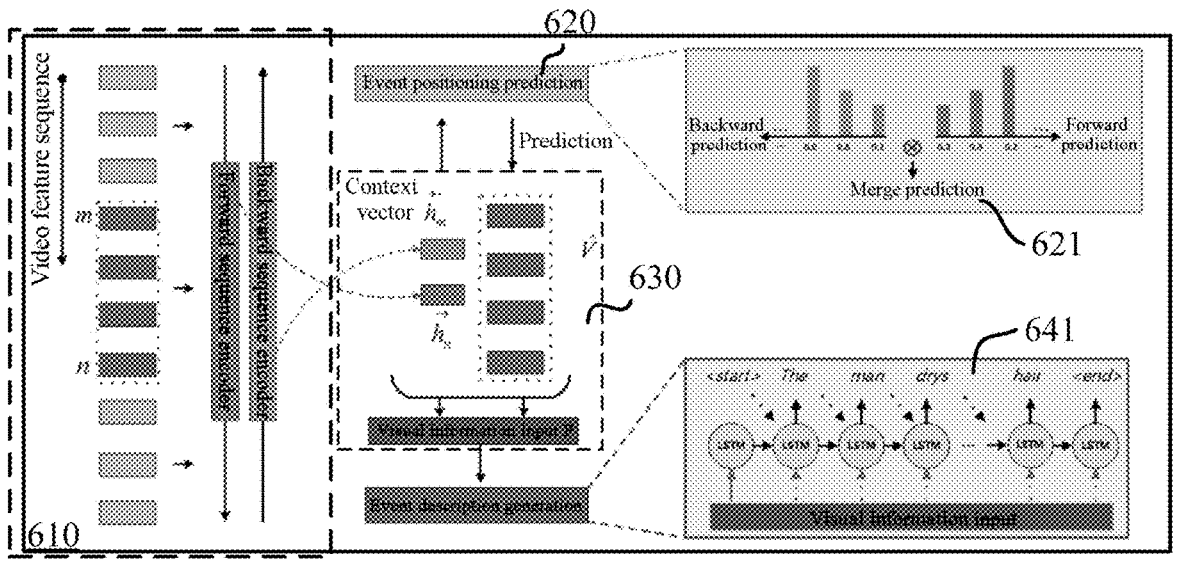
FIG. 10 is a schematic diagram of an overall framework of video description generation according to an exemplary embodiment.

FIG. 10 is a schematic diagram of an overall framework of video description generation according to an exemplary embodiment. In this exemplary embodiment, video feature extraction is first performed on the video stream, that is, feature extraction using a sliding window is performed on the video stream, to obtain a video feature sequence: $V=\{v_1, v_2, \ldots, v_T\}$.

As shown in FIG. 10, on an overall framework of video description generation, the obtained video feature sequence is encoded at each video encoding moment by a forward sequence encoder and a backward sequence encoder, as shown in a frame 610.

It is to be understood that the forward sequence encoder is a forward recurrent neural network, and the backward sequence encoder is a backward recurrent neural network.

Context information, also known as a context vector, is obtained under the action of the forward sequence encoder and the backward sequence encoder. For example, for an interval from a video encoding moment m to a video encoding moment n, corresponding context vectors are $\overleftarrow{h}_m$ and $\overrightarrow{h}_n$.

As mentioned before, a forward hidden state sequence is obtained by the forward sequence encoder, and a backward hidden state sequence is obtained by the backward sequence encoder.

So far, in the executed step 620, event positioning prediction is performed, and it is obtained through positioning by using the forward hidden state sequence and the backward hidden state sequence that an interval corresponding to an event at a video encoding moment is an interval from a video encoding moment m to a video encoding moment n.

In the interval, visual feature detection is performed on a video segment in the interval to obtain visual features $v_i \in \hat{V} = \{v_k\}_{k=1, \ldots, p}$, and then, as the implementation of a frame 630, a visual information input F is constructed by using the context vectors and the visual features $v_i \in \hat{V} = \{v_k\}_{k=1, \ldots, p}$, that is, a feature inputted to the decoder is constructed, so that an event description can be generated under the action of the visual information input F.

Further, the event positioning prediction performed, that is, the execution of step 620, is forward prediction and backward prediction under the action of the forward sequence encoder and the backward sequence encoder, to perform historical and future prediction on a video encoding moment, and merge prediction is performed on the historical and future prediction. Details are shown in a frame 620.

For the event description generation, as shown in a frame 641, each video encoding moment is decoded under the action of an LSTM unit, and a word generated for each video encoding moment is obtained by using the constructed visual information input F, so that a language annotation of each event in the entire video stream is finally formed.

Figure 11:
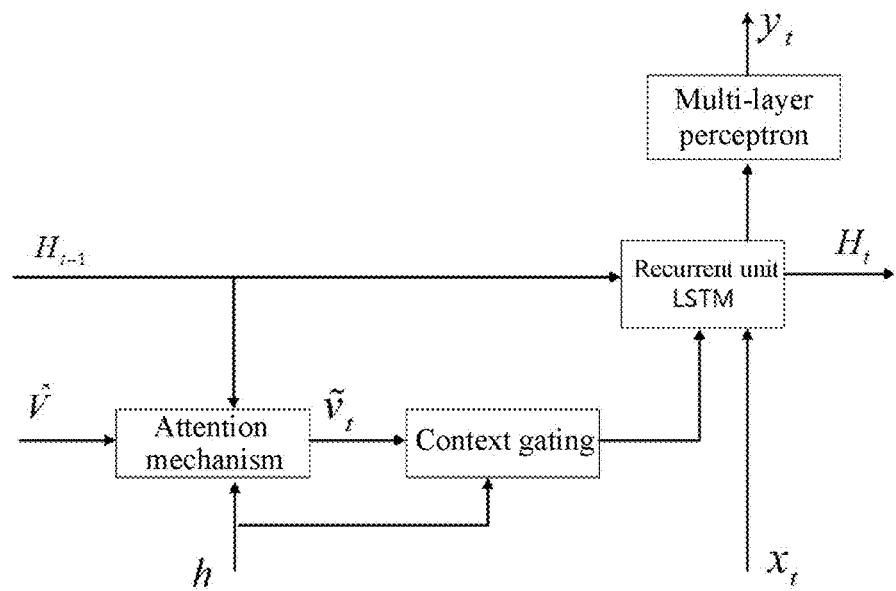
FIG. 11 is a flowchart of dynamic selective fusion of context gating adjustment according to an exemplary embodiment.

Further, FIG. 11 is a flowchart of dynamic selective fusion of context gating adjustment according to an exemplary embodiment. The construction of the visual information input F and the event description generation performed in FIG. 10 are completed through the implementation shown in FIG. 11.

Specifically, the visual features $v_i \in \hat{V} = \{v_k\}_{k=1, \ldots, p}$ are integrated with the current state of the decoder $z_i^t = W_a^T \cdot \tanh(W_v \cdot v_i + W_h \cdot [\overrightarrow{h}_n, \overleftarrow{h}_m] + W_H \cdot H_{t-1} + b)$ and the context vector h through the attention mechanism, to obtain an integrated event feature $\tilde{v}^t = \sum_{t=1}^{P} \alpha_i^t \cdot v_i$.

The gating operation is performed on the obtained event feature $\tilde{v}^t = \sum_{t=1}^{P} \alpha_i^t \cdot v_i$ and the context vector h under the action of context gating, to adaptively adjust the event feature and the context vector, and a video information input F is constructed under the action of an output value.

The video information input F is inputted to a recurrent unit LSTM, and an output is obtained under the action of a multi-layer perceptron, that is, a word of a natural language description is constructed. It is to be understood that the output value of the context gating is used to adaptively adjust the feature $x_t$ inputted to the recurrent unit to obtain the output $y_t$.

In the implementation of this process, the capability of video intensive description can be enhanced, and event positioning and corresponding text description of a long video can be obtained. A text label can be added to the video, and video retrieval or segment retrieval can be performed on the video through text and sentences, thereby implementing fast and segment selective playback of the video.

Apparatus embodiments of the present disclosure are described below, and may be used for performing the embodiment of the video description generation method of the present disclosure. For details that are not disclosed in the apparatus embodiments of the present disclosure, refer to the embodiment of the video description generation method of the present disclosure.

Figure 12:
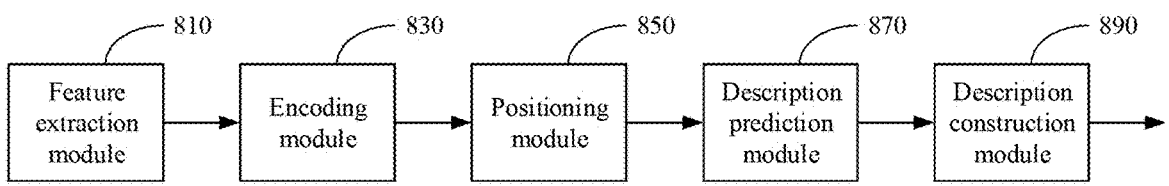
FIG. 12 is a block diagram of a video description generation apparatus according to an exemplary embodiment.

FIG. 12 is a block diagram of a video description generation apparatus according to an exemplary embodiment. The video description generation apparatus, as shown in FIG. 12, includes but is not limited to: a feature extraction module 810, an encoding module 830, a positioning module 850, a description prediction module 870, and a description construction module 890.

The feature extraction module 810 is configured to extract video features, and obtain a video feature sequence corresponding to video encoding moments in a video stream.

The encoding module 830 is configured to encode the video feature sequence by using a forward recurrent neural network and a backward recurrent neural network, to obtain a forward hidden state sequence and a backward hidden state sequence corresponding to each video encoding moment.

The positioning module 850 is configured to position, according to the forward hidden state sequence and the backward hidden state sequence, an event corresponding to each video encoding moment and an interval corresponding to the event at the video encoding moment.

The description prediction module 870 is configured to predict a video content description of the event according to the interval corresponding to the event at the video encoding moment, and generate a word corresponding to the event at the video encoding moment.

The description construction module 890 is configured to construct a natural language description of the event in the video stream by using all words of the event that correspond to the video encoding moments.

In an exemplary embodiment, the feature extraction module 810 is further configured to extract a video feature of the video stream at each video encoding moment according to a specified time interval, the video features corresponding to the video encoding moments sequentially forming the video feature sequence.

Figure 13:
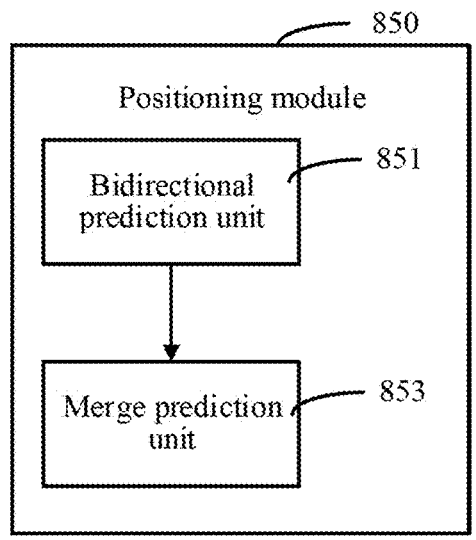
FIG. 13 is a block diagram for describing details of a positioning module according to the embodiment corresponding to FIG. 12.

FIG. 13 is a block diagram for describing details of a positioning module according to the embodiment corresponding to FIG. 12. In an exemplary embodiment, the positioning module 850, as shown in FIG. 13, includes but is not limited to: a bidirectional prediction unit 851 and a merge prediction unit 853.

The bidirectional prediction unit 851 is configured to perform forward prediction and backward prediction by using the forward hidden state sequence and the backward hidden state sequence, to obtain forward candidate intervals and credibilities corresponding to the forward candidate intervals as well as backward candidate intervals and credibilities corresponding to the backward candidate intervals for each video encoding moment.

The merge prediction unit 853 is configured to perform, for each video encoding moment, merge prediction on the forward candidate intervals and the backward candidate intervals according to the corresponding credibilities, a merge credibility obtained by the merge prediction positioning an event corresponding to the video encoding moment, and a forward candidate interval and a backward candidate interval that are predicted to be merged corresponding to the event forming an interval corresponding to the event at the video encoding moment.

Figure 14:
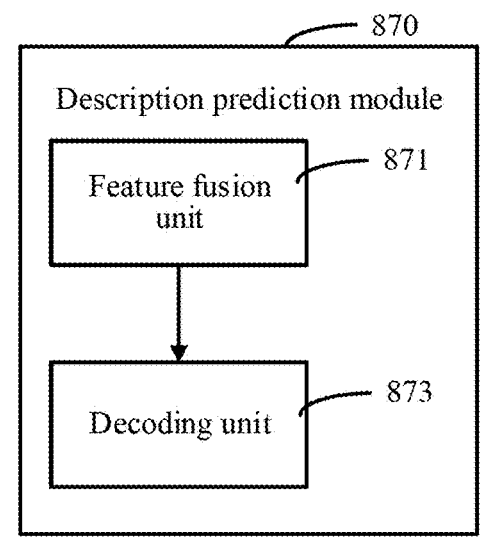
FIG. 14 is a block diagram for describing details of a description prediction module according to the embodiment corresponding to FIG. 12.

FIG. 14 is a block diagram for describing details of a description prediction module according to the embodiment corresponding to FIG. 12. The description prediction module 870, as shown in FIG. 14, includes but is not limited to: a feature fusion unit 871 and a decoding unit 873.

The feature fusion unit 871 is configured to perform, in the interval corresponding to the event at the video encoding moment, event feature fusion detection for the event to obtain an event feature corresponding to the event at the video encoding moment.

The decoding unit 873 is configured to decode the video encoding moment by using the event feature corresponding to the event at the video encoding moment and context information mapped by the interval, to generate the word corresponding to the event at the video encoding moment.

Figure 15:
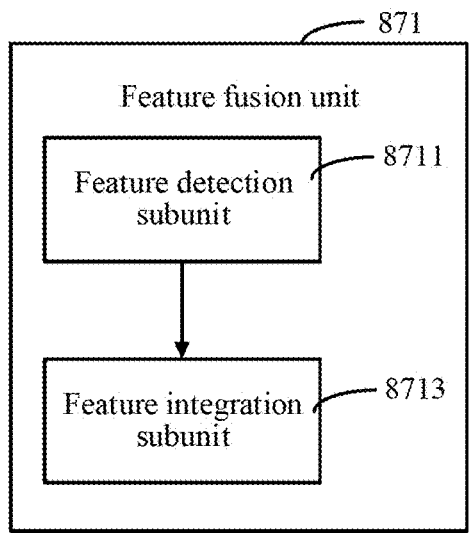
FIG. 15 is a block diagram for describing details of a feature fusion unit according to the embodiment corresponding to FIG. 12.

FIG. 15 is a block diagram for describing details of a feature fusion unit according to the embodiment corresponding to FIG. 12. The feature fusion unit 871, as shown in FIG. 15, includes but is not limited to: a feature detection subunit 8711 and a feature integration subunit 8713.

The feature detection subunit 8711 is configured to detect visual features in the interval corresponding to the event at the video encoding moment.

The feature integration subunit 8713 is configured to integrate, under an attention mechanism, the visual features according to the context information mapped by the interval, to obtain the event feature corresponding to the event at the video encoding moment.

Figure 16:
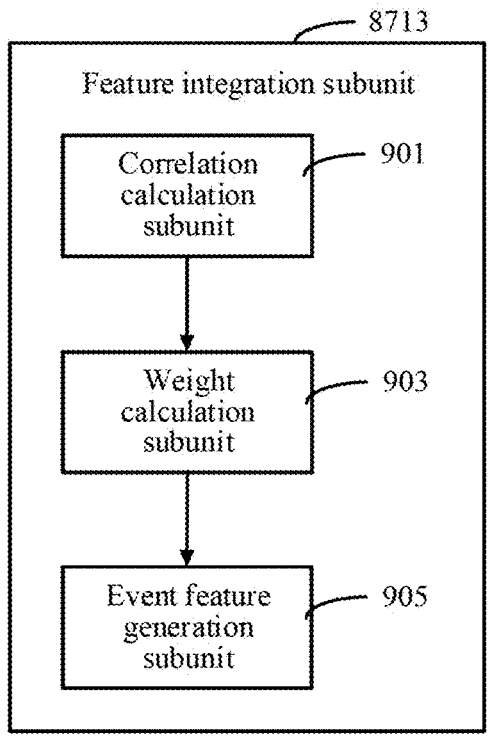
FIG. 16 is a block diagram for describing details of a feature integration subunit according to the embodiment corresponding to FIG. 15.

FIG. 16 is a block diagram for describing details of a feature integration subunit according to the embodiment corresponding to FIG. 15. The feature integration subunit 8713, as shown in FIG. 16, includes but is not limited to: a correlation calculation subunit 901, a weight calculation subunit 903, and an event feature generation subunit 905.

The correlation calculation subunit 901 is configured to generate, relative to the event with the assistance of the context information mapped by the interval, state information of a word corresponding to a previous video encoding moment, and calculate a correlation between the state information and the visual features.

The weight calculation subunit 903 is configured to calculate a weight of each visual feature of the event in the corresponding interval according to a correlation between the visual features and predicted video content of the event at the previous video encoding moment.

The event feature generation subunit 905 is configured to integrate the visual features of the event in the corresponding interval according to the corresponding weights, to generate the event feature corresponding to the event at the video encoding moment.

Figure 17:
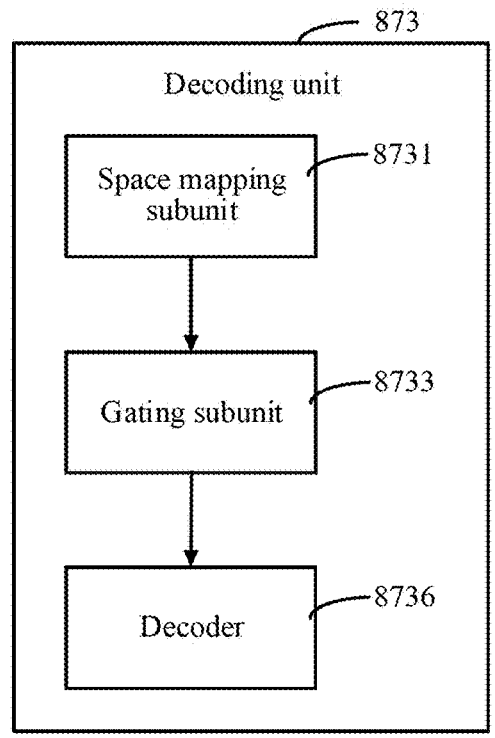
FIG. 17 is a block diagram for describing details of a decoding unit according to the embodiment corresponding to FIG. 14.

FIG. 17 is a block diagram for describing details of a decoding unit according to the embodiment corresponding to FIG. 14. The decoding unit 873, as shown in FIG. 17, includes but is not limited to: a space mapping subunit 8731, a gating subunit 8733, and a decoder 8735.

The space mapping subunit 8731 is configured to map, to a same logical space, the event feature corresponding to the event at the video encoding moment and the context information mapped by the corresponding interval.

The gating subunit 8733 is configured to perform a gating operation on the event feature and the context information that are mapped to the same logical space, to adaptively construct a feature inputted to a decoder by the event at the video encoding moment.

The decoder 8735 is configured to predict and generate the word corresponding to the event at the video encoding moment by using the feature inputted to the decoder by the event at the video encoding moment through the gating operation.

Figure 18:
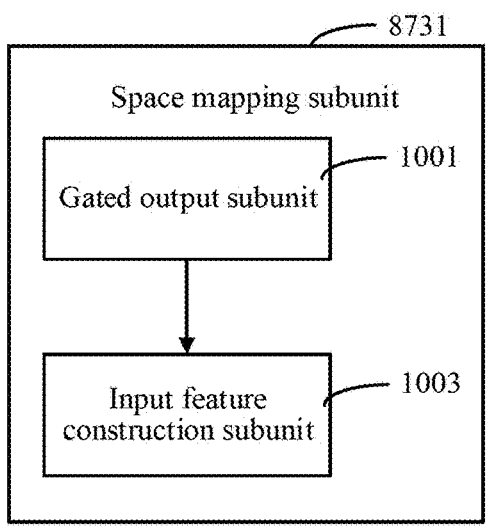
FIG. 18 is a block diagram for describing details of a space mapping subunit according to the embodiment corresponding to FIG. 17.

FIG. 18 is a block diagram for describing details of a space mapping subunit according to the embodiment corresponding to FIG. 17. The space mapping subunit 8731, as shown in FIG. 18, includes but is not limited to: a gated output subunit 1001 and an input feature construction subunit 1003.

The gated output subunit 1001 is configured to perform, in combination with a word generated from predicted video content of the event and state information at a previous video encoding moment, non-linear transformation on the event feature and the context information that are mapped to the same logical space, to generate a gated output value.

The input feature construction subunit 1003 is configured to adaptively adjust, by using the gated output value, the event feature and the context information that are mapped to the same logical space, a feature that is obtained after the adjustment of the event feature and the context information forming a feature input to a decoder by the event at the video encoding moment.

Optionally, the present disclosure further provides a resource recommendation apparatus. The resource recommendation apparatus can be used in the foregoing implementation environment to perform all or some of the steps of any of the methods shown above. The apparatus includes:

a processor; and a memory, configured to store computer-readable instructions, the computer-readable instructions, when executed by the processor, implementing the foregoing method.

A specific implementation of operations performed by the processor of the apparatus in this embodiment is described in detail in the embodiments of the foregoing method, and details are not described herein.

In an exemplary embodiment, a storage medium is further provided. The storage medium is a computer-readable storage medium. For example, the storage medium may be a transitory or non-transitory computer-readable storage medium including instructions. The storage medium may be, for example, a memory including instructions. The foregoing instructions may be executed by a processor of an apparatus to complete the foregoing method.

Based on the exemplary embodiments described above, video description generation can be instantly performed during playback of a video in the foreground, so that a natural language description corresponding to each event that exists in the video content can be displayed during the playback of the video. By analogy, corresponding natural language descriptions can be obtained for all events that exist in the entire playback process of the video, even temporally overlapping events, in the video content being played.

Based on this, a video playing method and apparatus that can instantly generate a video description for an input video stream will be implemented. By using the video playing apparatus, a natural language description corresponding to a predicted event can be displayed synchronously during playback of a video.

First, the present disclosure provides a video playing method, applicable to a computer device, including:

obtaining, during playback of a video, a video feature sequence corresponding to video encoding moments in video description generation, and determining a forward hidden state sequence and a backward hidden state sequence corresponding to each video encoding moment;

positioning, according to the forward hidden state sequence and the backward hidden state sequence, an event corresponding to each video encoding moment and an interval corresponding to the event at the video encoding moment;

predicting a video content description of the event according to the interval corresponding to the event at the video encoding moment, and instantly obtaining a natural language description of the event at the video encoding moment in a video stream; and displaying, according to the video encoding moment and a progress of the played video, the corresponding natural language description for the event that occurs in played video content.

Secondly, the present disclosure further provides a video playing apparatus including a processor and a memory, the memory storing computer-readable instructions, and the computer-readable instructions, when executed by the processor, implementing the following operations:

obtaining, during playback of a video, a video feature sequence corresponding to video encoding moments in video description generation, and determining a forward hidden state sequence and a backward hidden state sequence corresponding to each video encoding moment;

predicting a video content description of the event according to the interval corresponding to the event at the video encoding moment, and instantly obtaining a natural language description of the event at the video encoding moment in a video stream; and displaying, according to the video encoding moment and a progress of the played video, the corresponding natural language description for the event that occurs in played video content.

So far, the event in the video stream being played is positioned and the natural language description of the video content related to the event is generated and displayed. In addition, at each video encoding moment, the event at the video encoding moment is positioned and the video content description of the positioned event is predicted according to the corresponding forward hidden state sequence and backward hidden state sequence. Therefore, temporally overlapping events can be effectively identified and then accurately described, and an accuracy rate of a natural language description of each event during the playback of the video reaches at least 95%.

It is to be understood that the video playing apparatus implemented in the present disclosure, on one hand, exists as a video player, that is, the apparatus plays an input video stream; and on the other hand, the apparatus is configured with a function of performing video description prediction on the input video stream in real time, so that the natural language description corresponding to each event is outputted synchronously while the video content of the input video stream is outputted.

For the detailed implementation of the video playing apparatus implemented in the present disclosure, refer to the embodiment of the video description generation method provided in the present disclosure.

The video playing apparatus is configured with functions of video playback and video description generation, so that the video playing apparatus can be deployed in various application scenarios according to requirements. For example, in a security monitoring scenario, a scene of video description is outputted synchronously during playback of a collected video, to further improve the performance of video content-based artificial intelligence applications.

Specifically, in the security monitoring scenario, videos of traffic conditions are collected through cameras deployed at different locations, and real-time monitoring of traffic conditions is implemented through display of the collected videos.

In the real-time monitoring of traffic conditions, for a car accident that occurs in the video, video content description of the car accident can be predicted after a video feature sequence is determined and the car accident is positioned, a and a natural language description of the car accident can be obtained.

Through the technical implementation of the present disclosure, for a car accident that occurs quickly in a video, a corresponding natural language description is provided when video content of the car accident is displayed. On one hand, the natural language description of the car accident can be obtained quickly and accurately. On the other hand, more detailed information of the car accident that occurs quickly in the video can be presented via the instantly outputted natural language description, thereby expanding the accuracy and richness of output information.

It is to be understood that the car accident in the video often occurs quickly. Therefore, video content corresponding to the car accident is also switched quickly during display of the video, and in fact, it is impossible to output valid information.

With the assistance of the accurately generated video description, that is, the natural language description corresponding to the car accident, the real condition of the car accident scene can be reproduced without dead angle.

Therefore, the technical implementation of the present disclosure can serve as assistance in the security monitoring scenario, to implement the security monitoring quickly and without omission, and the accuracy and efficiency of the security monitoring are greatly improved.

For another example, in a scenario where the video description is outputted synchronously during playback of the collected video, live broadcast at a speech site is used as an example for description.

A video of a speaker's speech process is collected at the speech site, to broadcast the speech process live by using a collected video stream.

As the speaker speaks, the video of the speaker's speech can be displayed by using the collected video stream. In this case, through the technical implementation of the present disclosure, a video content description corresponding to the speech process is generated and displayed accordingly.

Further, in the video content description generation, as described above, according to a forward hidden state sequence and a backward hidden state sequence corresponding to each video encoding moment, an existing event and an interval corresponding to the event at the video encoding moment are positioned, so that a natural language description is generated for each existing event accordingly.

Further, in the video content description generation, visual features are detected based on the interval corresponding to the positioned event at the video encoding moment. For example, the visual features include actions of the speaker captured from the video, and the obtained visual features are integrated to obtain an event feature, thereby implementing accurate video content generation.

In summary, according to the implementation of the foregoing application scenarios, it can be clearly seen that, through the technical implementation of the present disclosure, the performance of video applications is greatly improved, and the accurate identification and description of events during playback of the video also greatly expands the application scenarios of video applications.

Through the technical implementation of the present disclosure, temporally overlapping events in the video are identified, so that an accuracy rate of video description is doubled, and an accuracy rate of 95% or higher is achieved. For example, the following table shows experimental control data:

TABLE 1

| Video description generation method used | Accuracy score |
|---|---|
| Krishna et al. | 4.82 |
| Method of the present disclosure | 9.65 |

Table 1 shows experimental control results obtained by respectively applying the method of the present disclosure and the current best method Krishna et al. to video description generation of the same video. The accuracy score in the experimental control results is statistically generated based on a full score of 10 points.

It can be clearly seen that, through the technical implementation of the present disclosure, an accuracy rate of video description is doubled, and an accuracy rate of 95% or higher is achieved.

It is to be understood that the present disclosure is not limited to the precise structures described above and shown in the accompanying drawings, and various modifications and changes can be made without departing from the scope of the present disclosure. The scope of the present disclosure is limited only by the appended claims.

What is claimed is:

1. A video description generation method, comprising:
   extracting video features, and obtaining a video feature sequence corresponding to video encoding moments in a video stream;
   encoding the video feature sequence by using a forward recurrent neural network and a backward recurrent neural network, to obtain a forward hidden state sequence and a backward hidden state sequence corresponding to each video encoding moment;
   positioning, according to the forward hidden state sequence and the backward hidden state sequence, an event corresponding to each video encoding moment and an interval corresponding to the event at the video encoding moment, wherein the positioning comprises:
   performing forward prediction and backward prediction by using the forward hidden state sequence and the backward hidden state sequence, to obtain forward candidate intervals and credibilities corresponding to the forward candidate intervals as well as backward candidate intervals and credibilities corresponding to the backward candidate intervals for each video encoding moment; and
   performing, for each video encoding moment, merge prediction on the forward candidate intervals and the backward candidate intervals according to the corresponding credibilities, a merge credibility obtained by the merge prediction positioning the event corresponding to the video encoding moment, and a forward candidate interval and a backward candidate interval that are predicted to be merged corresponding to the event forming an interval corresponding to the event at the video encoding moment;
   predicting a video content description of the event according to the interval corresponding to the event at the video encoding moment, and generating a word corresponding to the event at the video encoding moment; and
   constructing a natural language description of the event in the video stream by using all words of the event that correspond to the video encoding moments.

2. The method according to claim 1, wherein the extracting video features, and obtaining a video feature sequence corresponding to video encoding moments in a video stream comprises:
   extracting a video feature of the video stream at each video encoding moment according to a specified time interval, the video features corresponding to the video encoding moments sequentially forming the video feature sequence.

3. The method according to claim 2, wherein the extracting a video feature of the video stream at each video encoding moment according to a specified time interval, the video features corresponding to the video encoding moments sequentially forming the video feature sequence comprises:

performing, according to a specified time interval, video feature extraction on the video stream at each video encoding moment by using a sliding window, the video features corresponding to the video encoding moments sequentially forming the video feature sequence.

4. The method according to claim 1, wherein the performing forward prediction and backward prediction by using the forward hidden state sequence and the backward hidden state sequence, to obtain forward candidate intervals and credibilities corresponding to the forward candidate intervals as well as backward candidate intervals and credibilities corresponding to the backward candidate intervals for each video encoding moment comprises:

performing forward prediction and backward prediction on the forward hidden state sequence and the backward hidden state sequence by using a layer of fully connected network, the forward prediction being predicting, in the forward hidden state sequence by using a layer of fully connected network, several intervals forward for each forward hidden state at a corresponding video encoding moment, the intervals obtained through prediction being forward candidate intervals;

mapping, for each forward candidate interval by performing a non-linear transformation operation, a forward hidden state to a space after passing through a neuron, and activating the forward hidden state after performing weighting and offset processing in the space, to obtain a credibility; and performing the operation on each backward candidate interval correspondingly, to obtain a corresponding credibility.

5. The method according to claim 1, wherein the predicting a video content description of the event according to the interval corresponding to the event at the video encoding moment, and generating a word corresponding to the event at the video encoding moment comprises:

performing, in the interval corresponding to the event at the video encoding moment, event feature fusion detection for the event to obtain an event feature corresponding to the event at the video encoding moment; and decoding the video encoding moment by using the event feature corresponding to the event at the video encoding moment and context information mapped by the interval, to generate the word corresponding to the event at the video encoding moment.

6. The method according to claim 5, wherein before the decoding the video encoding moment by using the event feature corresponding to the event at the video encoding moment and context information mapped by the interval, to generate the word corresponding to the event at the video encoding moment, the predicting a video content description of the event according to the interval corresponding to the event at the video encoding moment, and generating a word corresponding to the event at the video encoding moment further comprises:

obtaining, from the interval corresponding to the event at the video encoding moment, a front video encoding moment and a rear video encoding moment that are located at two ends of the interval; and forming the corresponding context information by using a forward hidden state corresponding to the front video encoding moment and a backward hidden state corresponding to the rear video encoding moment.

7. The method according to claim 5, wherein the performing, in the interval corresponding to the event at the video encoding moment, event feature fusion detection for the event to obtain an event feature corresponding to the event at the video encoding moment comprises:

detecting visual features in the interval corresponding to the event at the video encoding moment; and integrating, under an attention mechanism, the visual features according to the context information mapped by the interval, to obtain the event feature corresponding to the event at the video encoding moment.

8. The method according to claim 7, wherein the integrating, under an attention mechanism, the visual features according to the context information mapped by the interval, to obtain the event feature corresponding to the event at the video encoding moment comprises:

generating, relative to the event with the assistance of the context information mapped by the interval, state information of a word corresponding to a previous video encoding moment, and calculating a correlation between the state information and the visual features;

calculating a weight of each visual feature of the event in the corresponding interval according to a correlation between the visual features and predicted video content of the event at the previous video encoding moment; and integrating the visual features of the event in the corresponding interval according to the corresponding weights, to generate the event feature corresponding to the event at the video encoding moment.

9. The method according to claim 5, wherein the decoding the video encoding moment by using the event feature corresponding to the event at the video encoding moment and context information mapped by the interval, to generate the word corresponding to the event at the video encoding moment comprises:

mapping, to a same logical space, the event feature corresponding to the event at the video encoding moment and the context information mapped from the corresponding interval;

performing a gating operation on the event feature and the context information that are mapped to the same logical space, to adaptively construct a feature inputted to a decoder by the event at the video encoding moment; and predicting and generating, by the decoder, the word corresponding to the event at the video encoding moment by using the feature inputted to the decoder by the event at the video encoding moment through the gating operation.

10. The method according to claim 9, wherein the performing a gating operation on the event feature and the context information that are mapped to the same logical space, to adaptively construct a feature inputted to a decoder by the event at the video encoding moment comprises:

performing, in combination with a word generated from predicted video content of the event and state information at a previous video encoding moment, non-linear transformation on the event feature and the context information that are mapped to the same logical space, to generate a gated output value; and adaptively adjusting, by using the gated output value, the event feature and the context information that are mapped to the same logical space, a feature that is obtained after the adjustment of the event feature and the context information forming the feature inputted to the decoder by the event at the video encoding moment.

11. A video description generation apparatus, comprising:
a memory storing a plurality of instructions; and
a processor configured to execute the plurality of instructions, and upon execution of the plurality of instructions, is configured to:
extract video features, and obtain a video feature sequence corresponding to video encoding moments in a video stream;
encode the video feature sequence by using a forward recurrent neural network and a backward recurrent neural network, to obtain a forward hidden state sequence and a backward hidden state sequence corresponding to each video encoding moment;
position, according to the forward hidden state sequence and the backward hidden state sequence, an event corresponding to each video encoding moment and an interval corresponding to the event at the video encoding moment;
predict a video content description of the event according to the interval corresponding to the event at the video encoding moment;
perform, in the interval corresponding to the event at the video encoding moment, event feature fusion detection for the event to obtain an event feature corresponding to the event at the video encoding moment; and
decode the video encoding moment by using the event feature corresponding to the event at the video encoding moment and context information mapped by the interval, to generate a word corresponding to the event at the video encoding moment; and
construct a natural language description of the event in the video stream by using all words of the event that correspond to the video encoding moments.

12. The apparatus according to claim 11, wherein the processor, upon execution of the plurality of instructions, is further configured to:
perform forward prediction and backward prediction by using the forward hidden state sequence and the backward hidden state sequence, to obtain forward candidate intervals and credibilities corresponding to the forward candidate intervals as well as backward candidate intervals and credibilities corresponding to the backward candidate intervals for each video encoding moment; and
perform, for each video encoding moment, merge prediction on the forward candidate intervals and the backward candidate intervals according to the corresponding credibilities, a merge credibility obtained by the merge prediction positioning an event corresponding to the video encoding moment, and a forward candidate interval and a backward candidate interval that are predicted to be merged corresponding to the event forming an interval corresponding to the event at the video encoding moment.

13. The apparatus according to claim 11, wherein the processor, upon execution of the plurality of instructions, is further configured to:
detect visual features in the interval corresponding to the event at the video encoding moment; and
integrate, under an attention mechanism, the visual features according to the context information mapped by the interval, to obtain the event feature corresponding to the event at the video encoding moment.

14. A non-transitory computer-readable storage medium, storing a computer program, the computer program, when executed by a processor, is configured to cause the processor to:
obtain during playback of a video, a video feature sequence corresponding to each video encoding moment in video description generation, and determine a forward hidden state sequence and a backward hidden state sequence corresponding to each video encoding moment;
position, according to the forward hidden state sequence and the backward hidden state sequence, an event corresponding to each video encoding moment and an interval corresponding to the event at the video encoding moment;
predict a video content description of the event according to the interval corresponding to the event at the video encoding moment, and instantly obtain a natural language description of the event at the video encoding moment in a video stream by:
obtaining, from the interval corresponding to the event at the video encoding moment, a front video encoding moment and a rear video encoding moment that are located at two ends of the interval;
forming context information mapped by the interval by using a forward hidden state corresponding to the front video encoding moment and a backward hidden state corresponding to the rear video encoding moment; and
decoding the video encoding moment by using an event feature corresponding to the event at the video encoding moment and the context information mapped by the interval, to generate a word corresponding to the event at the video encoding moment; and
display, according to the video encoding moment and a progress of the played video, the corresponding natural language description for the event that occurs in played video content.

15. The non-transitory computer-readable storage medium according to claim 14, wherein in order to cause the processor to position, according to the forward hidden state sequence and the backward hidden state sequence, an event corresponding to each video encoding moment and an interval corresponding to the event at the video encoding moment, the computer program, when executed by the processor, is configured to cause the processor to:
perform forward prediction and backward prediction by using the forward hidden state sequence and the backward hidden state sequence, to obtain forward candidate intervals and credibilities corresponding to the forward candidate intervals as well as backward candidate intervals and credibilities corresponding to the backward candidate intervals for each video encoding moment; and
perform, for each video encoding moment, merge prediction on the forward candidate intervals and the backward candidate intervals according to the corresponding credibilities, a merge credibility obtained by the merge prediction positioning an event corresponding to the video encoding moment, and a forward candidate interval and a backward candidate interval that are predicted to be merged corresponding to the event forming an interval corresponding to the event at the video encoding moment.

16. The non-transitory computer-readable storage medium according to claim 15, wherein in order to cause the processor to perform forward prediction and backward prediction by using the forward hidden state sequence and the backward hidden state sequence, to obtain forward candidate intervals and credibilities corresponding to the forward candidate intervals as well as backward candidate intervals and credibilities corresponding to the backward candidate intervals for each video encoding moment, the computer program, when executed by the processor, is configured to cause the processor to:

perform forward prediction and backward prediction on the forward hidden state sequence and the backward hidden state sequence by using a layer of fully connected network, the forward prediction being predicting, in the forward hidden state sequence by using a layer of fully connected network, several intervals forward for each forward hidden state at a corresponding video encoding moment, the intervals obtained through prediction being forward candidate intervals;

map, for each forward candidate interval by performing a non-linear transformation operation, a forward hidden state to a space after passing through a neuron, and activate the forward hidden state after performing weighting and offset processing in the space, to obtain a credibility; and perform the operation on each backward candidate interval correspondingly, to obtain a corresponding credibility.

17. The non-transitory computer-readable storage medium according to claim 14, wherein the computer program, when executed by the processor, is further configured to cause the processor to:

perform, in the interval corresponding to the event at the video encoding moment, event feature fusion detection for the event to obtain the event feature corresponding to the event at the video encoding moment.

\* \* \* \* \*